United States Patent [19]

Ghose et al.

[11] Patent Number: 4,881,140

[45] Date of Patent: Nov. 14, 1989

[54] INTEGRATED DISC DRIVE AND ACTUATORS SUPPORT

[75] Inventors: Sanjoy Ghose, Santa Cruz; Efim Bronshvatch, Saratoga; Miles L. Peterson, San Jose, all of Calif.

[73] Assignee: Seagate Technology, Inc., Scotts Valley, Calif.

[21] Appl. No.: 115,691

[22] Filed: Nov. 2, 1987

Related U.S. Application Data

[63] Continuation-in-part of Ser. No. 914,690, Oct. 2, 1986, abandoned.

[51] Int. Cl.⁴ .............................................. G11B 5/55
[52] U.S. Cl. ................................... 360/106; 360/99.08
[58] Field of Search .............. 360/106, 104, 105, 109, 360/97-99

[56] References Cited

U.S. PATENT DOCUMENTS

| | | | |
|---|---|---|---|
| 4,490,635 | 12/1984 | Harrison et al. | 360/106 X |
| 4,556,924 | 12/1985 | Quist, Jr. et al. | 360/106 |
| 4,682,255 | 7/1987 | Sleger et al. | 360/106 |
| 4,745,504 | 5/1988 | Foote | 360/106 |

*Primary Examiner*—Stuart N. Hecker
*Assistant Examiner*—David J. Severin
*Attorney, Agent, or Firm*—Flehr, Hohbach, Test, Albritton & Herbert

[57] ABSTRACT

In a disc drive, the normal bearing pivot assembly is replaced with a combination of a lightweight actuator arm and biasing strip spring. One end of the strip spring is mounted to a block and the effective force of the spring is aligned with the actuator arm running toward the stepper motor. The other, or head end of the actuator arm contains a gear sector having gear teeth on its face which mesh with a pinion on a motor shaft so rotation of the motor shaft across the face of the gear sector causes movement of the head mounting arm.

9 Claims, 4 Drawing Sheets

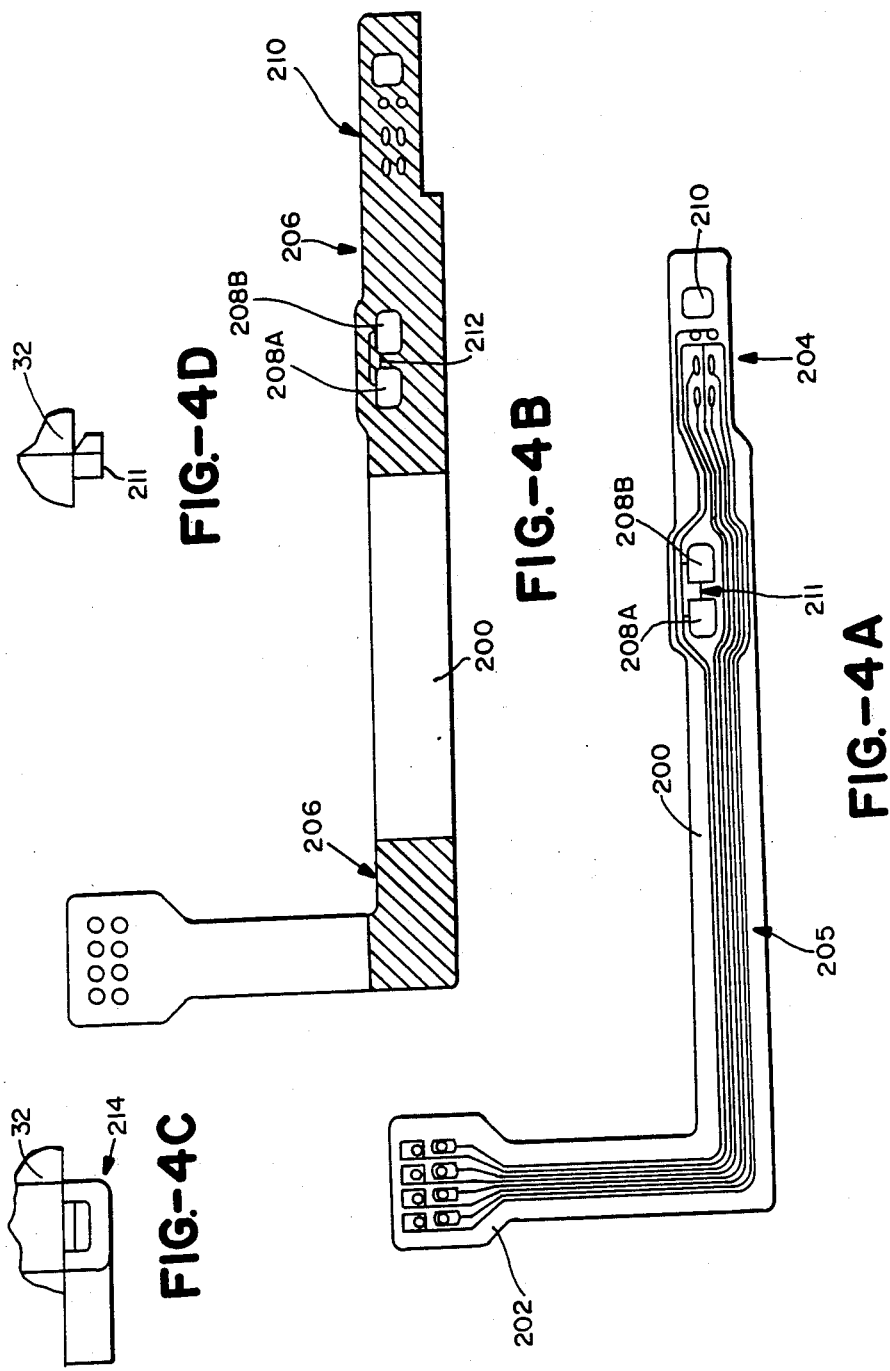

INTEGRATED DISC DRIVE AND ACTUATORS SUPPORT

CROSS-REFERENCE TO A RELATED APPLICATION

This application is a continuation of U.S. application Ser. No. 914,690 filed Oct. 2, 1986, now abandoned.

SUMMARY OF THE INVENTION

1. Field of the Invention

This invention is directed generally to the field of disc drives incorporating rotary actuators, and more particularly to an improved pivot mechanism for the actuator.

2. Background of the Invention

Disc drive machines record and reproduce information stored on concentric circular tracks on magnetic discs. Tracks are written and read by magnetic heads which must be accurately positioned over one of the tracks on the surface of the disc. Various methods have been used to position the heads. The two common types of head positioning mechanisms are linear and rotary head actuators.

One objective herein is to provide an improved disc drive rotary actuator. The common form of rotary actuator includes a head arm, flexure, read/write head and head arm extending out from a pivot. Extending from the pivot to essentially form a "V" shaped arm assembly is an actuator arm which in turn is coupled to a stepper motor. One common feature of known rotary actuator mechanism is the requirement of a high accuracy pivot mechanism at this juncture between the actuator arm and head arm.

It is an objective of the present invention to provide an improved pivot mechanism for use in a rotary actuator.

Due to read/write head positioning requirements, the pivot mechanism must offer high precision reliability, and low mechanical resistance. It is an objective of the present invention to meet these design requirements in a pivot mechanism which is easily constructed.

The pivot mechanism in the prior art generally consists of a shaft supporting the juncture of the two arms, i.e., actuator drive arm and head arm, two high class ball bearings, spring retainers, preload springs, plus attachment means to the base casting and the arm or arms.

It is an objective herein to provide a significantly improved pivot mechanism in terms of simplicity of design and ease of assembly as well as having a significantly reduced parts count. It is a further objective of the present invention to provide a simple and highly reliable pivot mechanism which still offers the required precision and reliability of other, more complex pivot mechanisms.

Another integral portion of any pivot mechanism is transmission between stepper motor shaft and drive arm. Typically, the motor shaft is located perpendicular to the actuator arm and coupled thereto through bands which wind and unwind on the pulley with rotation of the shaft, thereby moving the actuator arm back and forth.

A further objective of this invention is to eliminate the drive bands that are used to couple stepper motor to actuator arm to control track accessing. Prior efforts have been made in this direction by providing a frictional coupling between a sector at the end of the actuator arm and the motor shaft. However, such a connection is clearly subject to misalignment in the event of shock, and accurate realignment can be quite difficult. Also, the frictional coupling effect can diminish with time, and particles can be shed from this coupling transmission which are harmful to the operation of the drive.

An objective of this invention is to provide a coupling transmission between actuator arm and motor shaft pulley which relies on neither belts nor pure friction.

SUMMARY OF THE INVENTION

The above and other objectives of this invention are achieved by replacing the normal bearing pivot assembly with a combination of a lightweight actuator arm and biasing strip spring. One end of the strip spring is mounted to a block and the effective force of the spring is aligned with the actuator arm running toward the stepper motor. The other, or head end of the actuator arm contains a gear sector having gear teeth on its face which mesh with a pinion on a motor shaft so rotation of the motor shaft across the face of the gear sector causes movement of the head mounting arm.

In this way, the normal bearing pivot assembly is eliminated. A low cost, easily assembled disc drive assembly is provided utilizing a minimum number of parts. Minimal off-tracking occurs with shock because of the existing spring forces on the actuator arm. Further, tooth wear of the gear sector or pinion will cause minimal off-track radially since the wear causes mostly tangential motion of the head on the track. Also, the spring force keeps the gear sectors pressed tightly against the pinion on the spring drive shaft so that contact does not diminish with time. These spring means are further provided to substantially maintain the gear sectors and pinion in contact, even in the event of operating shock.

In an especially useful embodiment of this invention, the actuator arm is formed of a self-lubricating polymer or other lightweight self-lubricating material. This way, wear on the gear is reduced; and as the teeth are worn, the gear is still tightly biased against the pinion to maintain accurate movement of the actuator arm with rotation of the pinion.

In a further advantageous feature of this invention, means are provided for reliably fastening the cable which conveys signals from the heads to the interface to the side of the actuator arm using a hook and eye and a quick solder joint, rather than only adhesive, which loses its grip with age.

Brief Description of the Drawings

The features and advantages of this invention will be better understood with reference to the following figures:

FIGS. 4A, 4B, 4C, and 4D are a plan views of the cable connecting the transducer heads to the external interface devices herein and the mounting hook.

Detailed Description of a Preferred Embodiment

Figure 1:
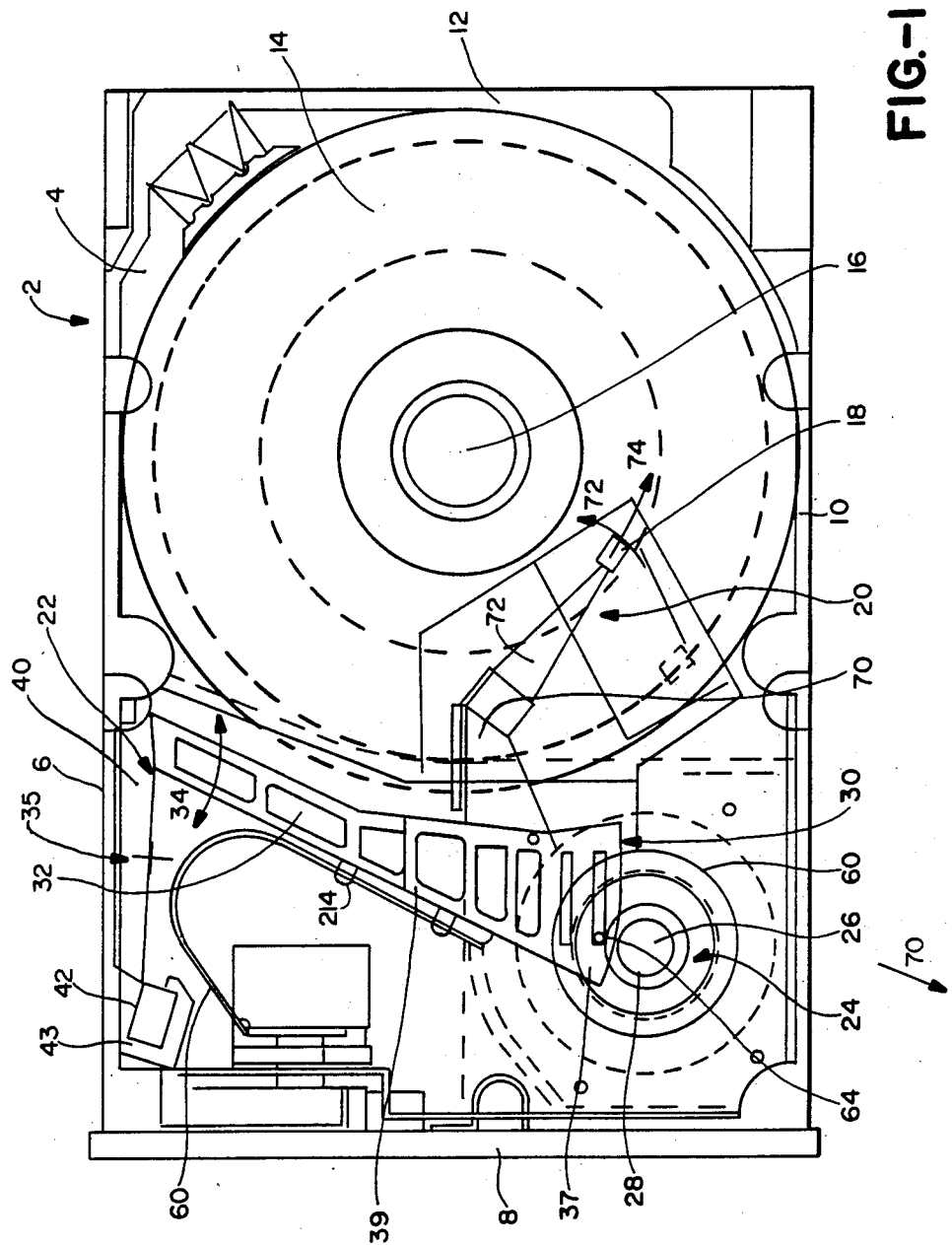
FIG. 1 is a top plan view of the major elements of the disc drive and disk-drive base casting designed in accordance with this invention.

In all the figures, like components are designated by like reference numerals. Referring to FIG. 1, the major elements of a disc drive are shown including a housing 2 including a baseplate 4 and upright walls 6, 8, 10 and 12. The integral casting for the base of this disc drive is disclosed in greater detail below, as shown in FIG. 4.

A data storage disc 14 is mounted within the housing for rotation about a spindle 16, and a transducer 18 is provided for reading and writing data on the disc. The transducer 18 is positioned using a head actuator arm assembly combination generally indicated at 20.

The arm assembly 20 pivots around a biasing mounting spring, 22 which will be described in detail below in re5 sponse to rotation of a stepper motor 24 which is mounted beneath the baseplate 4 with its shaft 26 extending up through the baseplate. The motor shaft 26 has a pinion 28 machined thereon to mesh with gear teeth 30 on the end of actuator arm 32. Therefore, it is clear that rotation of the motor 28 across the face of the gear sector 30 causes movement of the arm assembly 20 generally along the arc defined by arrow 34. As the actuator arm 32 moves, it pivots about a theoretical pivot point 35 to move the transducer head 18 from track to track.

The essential elements of the supporting assembly 22 are also seen in FIG. 1 and comprise a flexed metal strip 40 mounted on a support block 42 which in turn is inserted into a mounting block 43 on the side wall 6 of the housing. The mounting block 43 could as easily be mounted on the base casting 4. Alternative approaches to mounting this flexure are shown in U.S. application Ser. No. 115,536 filed Oct. 30, 1987, now U.S. Pat. No. 4,845,574, entitled "Disc Drive Incorporating Automatic Wear Compensation for a Pivoted Arm" by Wilkinson, incorporated herein by reference.

The strip 40 of flexible material is capable of exerting a strong force along the length of the arm 32. The direction of the spring force is essentially along a line that would pass through the center line of the gear sector 30 and through the motor shaft 26; obviously, with rotation of the motor and movement of the actuator arm, some deflection of the spring occurs, but some spring force is always exerted along this initial path to maintain the gear sector teeth on face 30 constantly in tight coupling transmission arrangement with the pinion 28 so that even with wear or shock, a tight connection continues to exist.

The fexible strip 40 thereby provides a horizontally mounted, bearingless pivot for the actuator arm 32, to cause rotation of the actuator head portion 37 about the phantom pivot point 35. The length of the strip spring 40 is chosen so that the phantom pivot point 35 is about equidistant between the mounting block 43 and the end of the actuator arm 32 to which the strip is fastened. It can be seen that the major portion 39 (i.e. from spring support to the head portion 37) of the actuator arm has a shape that roughly parallels the edge of the disc; the head portion 37 of the arm is set at an angle to the major portion so that the teeth 30 are carried on an arc having the center of rotation 35 as its center.

In a further feature of this invention, means are provided for preventing undue operating shock from causing misalignment in a direction perpendicular to the contact between the pinion 28 and gear sectors 30. To accomplish this, a groove 60 is formed in the top of the armature head 37. A pin 64 is formed in the bottom of the overhanging portion 65 of the motor support. The groove 60 describes the arc followed by the gear sector 30 with rotation of the motor drive shaft so that in the event of a shock to the disc drive, contact between the gear sectors 30 and pinion 28 cannot be lost. Further, it should be noted that the drive is designed so that tooth wear of the gear sector or pinion causes a minimal amount of radial mistracking (see arrow 72) since wear causes mostly tangential motion as indicated by arrow 74 of the head on the track.

The actuator arm itself, including its entire length from the flexed metal strip 40 up to and including the teeth 30 at the end of the end portion 37, as well as the support arm 70 for the flexure 72 are made of a molded material which in a preferred embodiment comprises a polycarbonate having 30% carbon fiber, and 15% TFE lubricant. The polycarbonate is, of course, light in weight, and therefore supportable by the steel strip; the use of a self-lubricating material insures a lubricated interface between the teeth 30 on the actuator head and the teeth on the drive shaft 28.

The use of a polymer containing lubricating additives to form the actuator arm and flexure support portion of the arm provides a very lightweight arm which can be biased tightly against the gears machined on the shaft. The incorporation of lubricating additives into the polymer will lengthen the life of the arm.

Figures 2A, 2B:
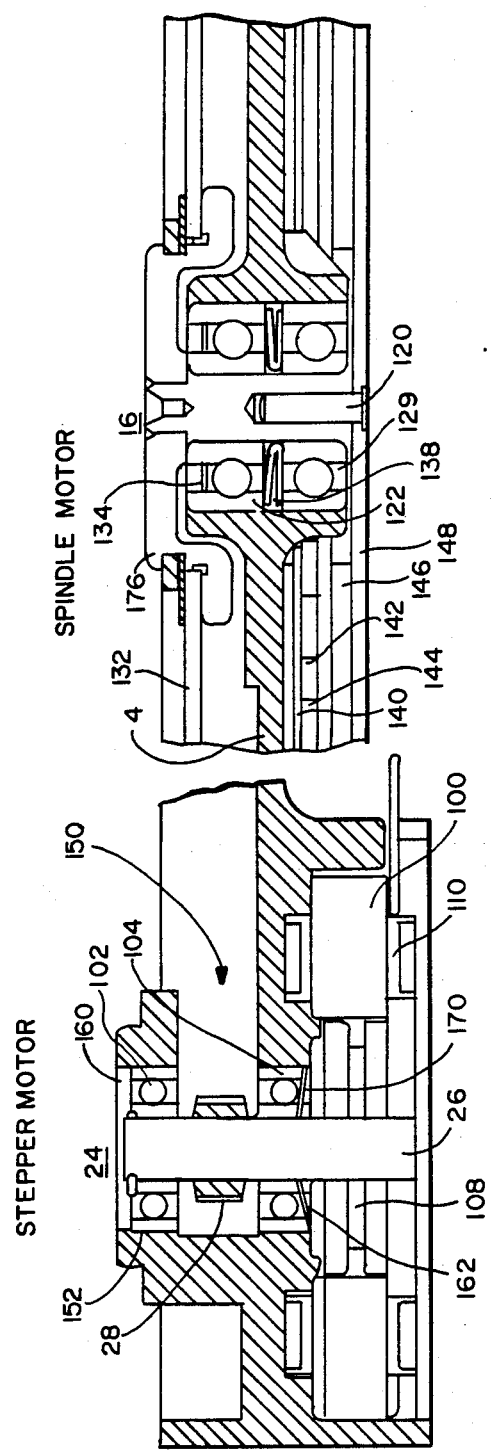
FIGS. 2A and 2B are sectional elevational views of one embodiment of the spindle motor and stepper motor as mounted in the casting of FIG. 1.

FIGS. 2A and 2B are sectional views of the casting in FIG. 1, the section being taken through the spindle motor 24 and the stepper motor 16 to show the unique mounting configuration of these two motors. The unitary configuration of the casting of FIG. 1 has been adopted to provide good registration of the motors one relative to the other to optimize the accuracy of positioning of the transducer relative to the disc without an unnecessary investment of time in alignment procedures during assembly, as well as to reduce the assembly costs of the entire disc drive system.

The disc drive housing and motors of this invention are specifically designed to minimize the height of the disc drive, an important consideration, especially in use in portable personal computers and similar systems. Therefore, the design of both the spindle motor and stepper motor have been modified and specially adopted to integrate their design into the drive base casting, maximize the ease of assembly of each of the motors, and optimize the alignment of the motors and especially their vertical drive shafts. The design of the stepper motor is disclosed in U.S. application Ser. No. 116,374 filed simultaneously herewith, entitled, "Encapsulated Stepper Motor" by Heine, Klein, Kuwert and Seeger, the design of the spindle motor is disclosed in U.S. application Ser. No. 116,044,now U.S. Pat. No. 4,841,393, filed simultaneously herewith, entitled, "Improved Spindle Motor for a Disk Drive" by McLeod and Peterson. Both applications are incorporated herein by reference.

Looking first at the stepper motor in FIG. 2A, it can be seen that the stator stack is located below both the upper bearings 102 and lower bearings 104. As a result, the pinion 28 carried on the drive shaft 26 of this stepper motor 24 is located between the two sets of bearings 102, 104. This provides a very high level of accuracy in the alignment and the best possible support for this shaft, which is necessary and desirable in a stepper motor of this type, which is being used to drive an actuator arm. The stator stack 100 is located below and outside the drive shaft, with the rotor 108 being attached to the shaft 26 and located inside the stator stack 100. The windings which are also otherwise of conventional design, are located around the stator stack 100. Alternative approaches to this design appear in the incorporated application.

The spindle motor 16 is also of an extremely low profile, with the major elements including the bearing supporting the shaft being incorporated directly into the integral base casting. The shaft 120 of the spindle motor rotates inside the bearings 122, 124, which hold the shaft into the integral single piece casting 4. The hub which supports the discs 132 is pressed onto the top of the spindle, and seal 134 are located between the bearing and hub. Preload of the bearings is maintained with spring 138 which is arranged to produce a preload configuration known as DB in the art, which provides the greatest possible stability for the bearing system within the casting 4. The motor electronics comprise a steel base 140 mounted on the bottom of the main drive casting 4 supportig a plurality of coils generally indicated at 142 and hall effect devices 144 which effectively provide a commutation function. An axially polarized magnet 146 carried on rotor 148 and coupled directly to the shaft 110 and 120, responds to energization of the coils to cause the necessary rotation of the shaft and supported discs 132. The coils 142 are mounted on a printed circuit board which is printed directly on the base 140. In addition to the coils, the necessary hall effect devices 144 for winding commutation and drive circuits are mounted directly on the printed circuit board. The printed circuit board is fully described in the U.S. Application filed simultaneously herewith, entitled "Improved Spindle Motor for a Disc Drive", by McLeod and Peterson, previously referred to herein.

Returning to the stepper motor, it can be seen that the rack 30 will fit into the slot 150 defined by a hood portion 152 of the main casting and a lower body portion 154. In this way, the pinion 28 is exposed to make contact with the rack, and is maintained in the ideal desired vertical alignment by the upper bearings 102 and lower bearings 104. The top surface 152 has a hole 160 machined through; the bottom surface of the casting 154 has a hole 162 machined in and the bearings are then pressed into the casting to support the shaft. It is especially significant to note that by putting bearings on either side of the pinion, and the stator stack below the lower bearing, only a single machined piece is necessary to contain the motor where ordinarily, two machined end bell housings are necessary to hold the motor assembly together. The stiffness of the shaft in the bearings is assured by the preload spring 170 which constitutes a circular spring surrounding the shaft below the lower bearing. The preload configuration is of the DB type which provides maximum shaft stability. The effective support of the shaft is thus above the upper bearing and below the lower bearing providing the most effective support of the shaft and therefore, of the pinion.

Figure 3:
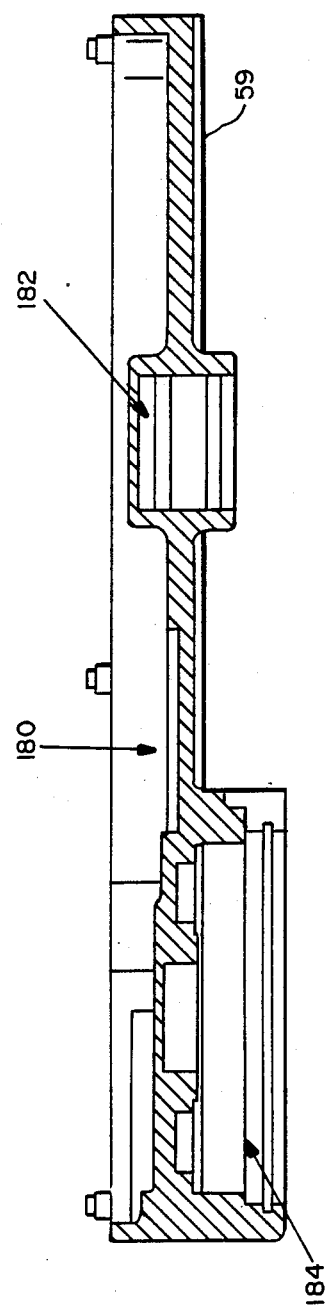
FIG. 3 is a vertical sectional view of an alternative embodiment of the base casting for the disc drive herein.

FIG. 3 shows an alternative embodiment of the unitary casting 180 which is characteristic of this invention. In this embodiment, the spindle motor 182 is again designed to have its bearings supported directly within the shoulders defined by the casting 180, with the pancake rotor supported below the base casting. The stepper motor 184 in this embodiment is of a type disclosed in the above-incorporated application entitled, "Encapsulated Stepper Motor", and fits entirely below the surface profile of the drive casting to further reduce the profile.

This invention also includes an improved means for supporting the cable on the side of the actuator arm. The cable that typically carries the wires to the disc drive head to convey the information picked up by the transducer to a signal processing interface (not shown) is simply glued to the side of the actuator arm 32 shown in FIG. 1. However, this is a relatively unreliable method, subject to the wires being easily loosened from the side of the actuator arm with age and constant arm motion.

According to the alternative mode disclosed herein with respect to FIGS. 4A-C, a wire cable 200 is provided having connectors 202 at one end for attachment to an interface to the control electronics which will process the signals, and connectors generally indicated at 204 for attaching the wires to the transducer. The signals are conveyed over wires 205, FIG. 4A.

In order to reliably support this cable on the actuator arm 32 adhesive is provided as shown by the lined regions 206. In addition, holes 208 A, B and 210 are provided to reliably hook the cable on the actuator arm. The opening 210, located beyond transducer connection point 204, is hooked over cable support 211 (FIG. 4D) which is found on the side of actuator arm 32.

In addition, a pair of holes 208A, B are provided in the center of the cable intermediate to the two sets of connectors 202, 204. A pretinned region 211 (FIG. 4A) is also provided overlapping the edges of these two holes. Finally, an eyelet 214 having a beveled center opening 215 (FIG. 4C) is provided on the side of the actuator arm 32. To support this cable on the side of the arm, it can simply and reliably be mounted on the side of the arm by pressing two openings 208A, B over this eyelet. A scored line 212 (FIG. 4B) through the region 210 will yield under this pressure, creating a slit that will allow the opening to be created to allow this cable to be supported on the hook. After the cable is in place, the pretinned region 211 is soldered, closing the opening created by score line 212 and capturing region 211 inside the eyelet. This preserves the integrity of the connection, and holds the cable firmly in place on the side of the actuator arm.

Other alternative embodiments of this invention may occur to a person of skill in the art who studies this disclosure. Therefore, the scope of this invention is to be limited only by the following claims.

What is claimed is:

1. A rotary actuator head positioning apparatus located within the housing of a disc drive comprising means for positioning a transducer relative to a recording medium comprising a constantly rotating disc within the housing, including
    an arm releasably having a transducer affixed to one end of a head arm portion,
    an elongate positioner arm being movable about a pivot point for positioning the transducer relative to the recording medium,
    spring means supporting an end of said arm assembly at a pivot point,
    first motor means mounted in the housing and having an output drive shaft coupled to a driven end of the arm assembly distal from said pivot point and the transducer for positioning the arm assembly selectively over tracks on the disc,
    second motor means mounted in said housing for supporting and constantly rotating said discs, whereby mounting both of said motors in said common base housing assures reliable relative positioning of said actuator and said discs, and said head arm portion being attached to the side of said positioner arm and extending directly over said disc from a location between said pivot point and said first motor mount.

2. Apparatus as claimed in claim 1 wherein said housing includes a single base casting for supporting said arm assembly and said motor, said base casting including an upright wall portion defining a housing envelope for a rotor and stator of said first motor means, whereby the need for a separate housing envelope for said motor is eliminated.

3. Apparatus as claimed in claim 2 wherein said first motor comprises a stepper motor including first and second bearings supporting said shaft in said housing, a pinion on said drive shaft between said first and second bearings providing coupling between the shaft and said positioner arm assembly.

4. Apparatus as claimed in claim 3 wherein said stator of said stepper motor is located outside the region defined by said first and second bearings.

5. A disc drive as in claim 1 wherein said motor means for positioning the arm assembly comprises a stepper motor supported by said housing with a shaft extending up through said housing to contact said distal end of the arm assembly.

6. A disc drive as in claim 5 wherein said stepper motor and said second motor means are each supported in a housing, said disc drive housing including a base casting having said stepper motor and second motor means housings as an integral part thereof.

7. A disc drive as in claim 6 wherein an actuator arm of said arm assembly from said end supported by the leaf spring to said driven end is made of a molded material comprising carbon filter 8. A disc drive as in claim 7 wherein said actuator arm material comprises a lubricant whereby the arm interface between the actuator arm and the stepper motor shaft is lubricated.

9. A disc drive as in claim 8 wherein said distal portion of said arm includes teeth which mate with gear sectors carried on the face of said motor shaft, engagement between said teeth and said sectors being maintained by the force exerted by said leaf spring.

* * * * *